UNITED STATES PATENT OFFICE.

ALEXANDER L. HOLLEY, OF BROOKLYN, NEW YORK.

IMPROVEMENT IN BESSEMER-STEEL-CONVERTER BOTTOMS.

Specification forming part of Letters Patent No. 133,938, dated December 17, 1872.

*To all whom it may concern:*

Be it known that I, ALEXANDER L. HOLLEY, of the city of Brooklyn, county of Kings and State of New York, have invented a new and useful Improvement in the Manufacture of Iron and Steel, referring to the construction and maintenance of converters employed in the Bessemer or pneumatic process; and that the following is a full, clear, and exact description thereof, reference being had to the accompanying drawing.

Figure 1 is a section on the line A B of Fig. 2; and Fig. 2 is a plan of a tuyere-box C of a Bessemer converter, and of the tuyeres D D, and of a part of the refractory material between the tuyeres, and of the mold P in which the refractory material is rammed up. The tuyeres and the refractory material form, and, for the purposes of this specification, are called, the "bottom" of the converter.

There are usually several duplicate bottoms, so that when one is worn away by use, another, previously rammed up and dried, can be inserted into the converter.

My invention is applicable to any form of bottom, and to any method of embedding the bottom in the converter.

The bottom is usually formed of crushed or ground silicious stone, together with a little fire-clay, and sometimes fire-brick. This refractory mixture, which is called "ganister," is usually rammed around the tuyeres and within the mold P.

It is important that the bottom, when placed in the converter for use, should be solid and hard, and compacted together as far as possible into a homogeneous mass in order to resist the abrading action of the fluid metal, slag, and blast in the converter. This is best accomplished by heating the rammed bottom so hot that the materials will partially fuse together. Applying such a heat to a bottom attached to an iron tuyere-box or an iron plate is obviously impracticable, because such a heat would crack and warp the iron, or possibly fuse it.

My improvement secures the hard bottom without subjecting the tuyere-box or iron-plate to an injurious heat; and consists, first, in forming the bottom partly of bricks of ganister or other suitable refractory material, as shown at E F G H I L M N. These bricks are so shaped that they can be set between and around the tuyeres. The small spaces between them and around the tuyeres, as at Q Q R R, are then rammed with plastic ganister in the usual manner, in order to make the bottom continuous. The bricks are provided with notches or their equivalents, as shown at S, Fig. 1, so that when the ganister is rammed between them the outer bricks will hold the inner bricks in place.

I do not confine myself to the precise arrangement of bricks shown. In different cases and with different materials I prefer to vary the number, size, and distribution of bricks, and sometimes I only put bricks in the central part of the bottom, the remainder being rammed in the usual way.

I prefer to make the bricks of about two-thirds silicious stone and one-third fire-clay. This or any suitable mixture is wetted, rammed or pressed into suitable molds, and the bricks thus formed are heated in a furnace or kiln until their cohesion and hardness are so much increased by the action of the heat as to make them better resist the wear of the iron, slag, and blast in the converter.

Ordinary fire-bricks of suitable shape may be used, but I prefer a more highly silicious and cheaper metal.

My improvement further consists in filling the spaces at Q and R around the tuyeres and between the bricks by pouring into them melted refractory material, such as tap-cinder or any suitable vitreous slag or compound that will sufficiently resist the iron that is treated in the converter. This fluid filling is tapped from a furnace or otherwise, as may be convenient, and poured into the space it is intended to fill. If any of these spaces are not thus fully closed I pour semi-fluid fire-clay and water into the cracks, and then dry the bottom, when it will be ready for setting into the converter.

My improvement further consists in a means of more certainly and rapidly drying such parts of the bottom as are rammed up in the usual way. For this purpose I insert plugs, one of which is shown at K, in the top plate T of the tuyere-box and ram the ganister around them. Upon the plug I form a coarse screw-thread. The plug can thus be easily screwed out of the ganister after the ramming, and the thread left in the ganister will hold the material that is put in the plug-hole after the bottom is dried. When the plug is withdrawn I dry the bottom in the usual manner. The hot air of a drying-oven entering at U into the air-space W over the tuyere-box will draw through the hole at K, thus drying and hardening the bottom, and the steam formed in the bottom will more readily escape by means of the hole K. I then stop the hole K with ganister, when the bottom will be ready for use.

Claims.

What I claim, and desire to secure by Letters Patent, is—

1. A converter-bottom formed in part of refractory bricks placed between the tuyeres, substantially as described.

2. The method of making converter-bottoms in part by means of bricks of suitable refractory material, formed and properly dried and compacted before they are placed in the bottom, and afterward placed therein, substantially by the means and for the purposes specified.

3. A converter-bottom formed of separate solid pieces of refractory material filled in and joined together by melted refractory material, substantially in the manner described.

4. The ventilating-hole K in the refractory material of a bottom, in combination with the air-space W over the tuyere-box, formed in the manner and for the purposes described.

A. L. HOLLEY.

Witnesses:
W. H. WEIGHTMAN,
T. B. BEECHER.